(12) United States Patent
Krulis et al.

(10) Patent No.: US 7,931,278 B2
(45) Date of Patent: Apr. 26, 2011

(54) SEAL ASSEMBLY FOR A ROTARY MEMBER

(75) Inventors: Filip Krulis, Osasco (IT); Francesco Vignolo, Bibiana (IT)

(73) Assignee: Corcos Industriale S.A.S. di Externa Italia S.R.L, Pinerolo, Turin (IT)

( * ) Notice: Subject to any disclaimer, the term of this patent is extended or adjusted under 35 U.S.C. 154(b) by 0 days.

(21) Appl. No.: 11/232,134

(22) Filed: Sep. 22, 2005

(65) Prior Publication Data
US 2007/0063450 A1    Mar. 22, 2007

(51) Int. Cl.
*F16J 15/32* (2006.01)
(52) U.S. Cl. .......................... 277/563; 277/568; 277/571
(58) Field of Classification Search .................. 277/559, 277/562, 563, 565, 568, 571, 400, 402
See application file for complete search history.

(56) References Cited

U.S. PATENT DOCUMENTS

| 3,561,770 | A | * | 2/1971 | Corsi et al. ..................... 277/562 |
| 3,838,862 | A | * | 10/1974 | Fern .............................. 277/400 |
| 3,930,655 | A | * | 1/1976 | Fern .............................. 277/559 |
| 4,759,553 | A | * | 7/1988 | Goodman et al. ............ 277/361 |
| 4,906,009 | A | * | 3/1990 | Saitoh ............................ 277/349 |
| 4,928,979 | A | * | 5/1990 | Nagasawa ..................... 277/348 |
| 5,209,499 | A | * | 5/1993 | Ruff et al. ..................... 277/551 |
| 5,649,710 | A |   | 7/1997 | Kanda |
| 5,895,052 | A | * | 4/1999 | Drucktenhengst et al. ... 277/351 |
| 6,149,158 | A | * | 11/2000 | Tripathy ....................... 277/307 |
| 6,257,587 | B1 | * | 7/2001 | Toth et al. ..................... 277/309 |
| 6,273,428 | B1 | * | 8/2001 | Sassi .............................. 277/348 |
| 6,357,325 | B1 |   | 3/2002 | Vogt |
| 6,428,015 | B1 |   | 8/2002 | Iwakata |
| 6,726,212 | B2 | * | 4/2004 | Oldenburg ..................... 277/353 |
| 6,991,234 | B2 | * | 1/2006 | Oldenburg ..................... 277/309 |
| 7,464,939 | B2 | * | 12/2008 | Matsui .......................... 277/317 |
| 2003/0209860 | A1 |   | 11/2003 | Kammerer et al. |
| 2004/0056428 | A1 | * | 3/2004 | Yoshida ........................ 277/572 |

FOREIGN PATENT DOCUMENTS

| EP | 1256749 A2 | 11/2002 |
| JP | 2003287142 | 10/2003 |

OTHER PUBLICATIONS

European Search Report, completed Oct. 11, 2004.

* cited by examiner

*Primary Examiner* — Shane Bomar
*Assistant Examiner* — Gilbert Y Lee
(74) *Attorney, Agent, or Firm* — WRB-IP LLP; David J Serbin

(57) ABSTRACT

There is described a seal assembly for sealing the gap between a rotary member and a fixed member, so as to prevent passage of a fluid from a first to a second environment located on opposite sides of the gap; the seal assembly has a first ring integral with the rotary member, a second ring integral with the fixed member, and an elastically deformable sealing member integral with the second ring and in turn having at least one lip cooperating in fluidtight manner with a mating portion of the first ring; and, on the side cooperating with the mating portion, the sealing member has a spiral groove which, in use, produces a fluid-dynamic pumping effect to pump the fluid away from the sealing area and towards the first environment.

8 Claims, 2 Drawing Sheets

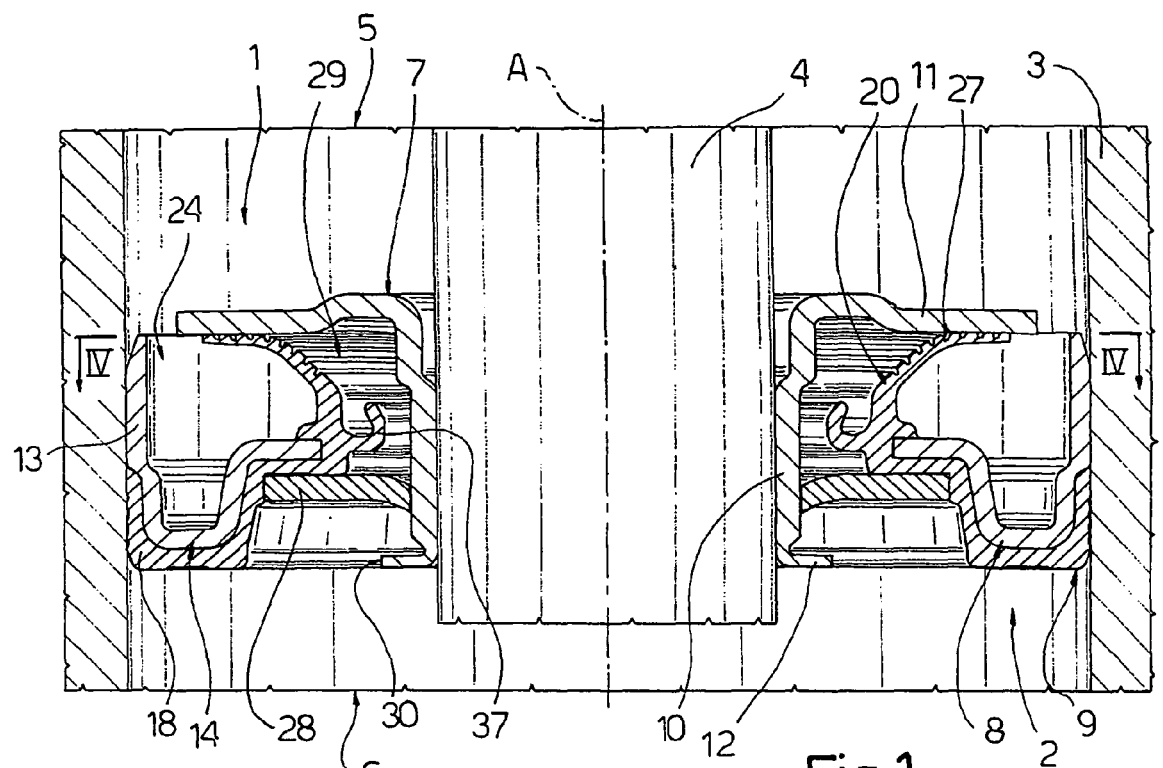
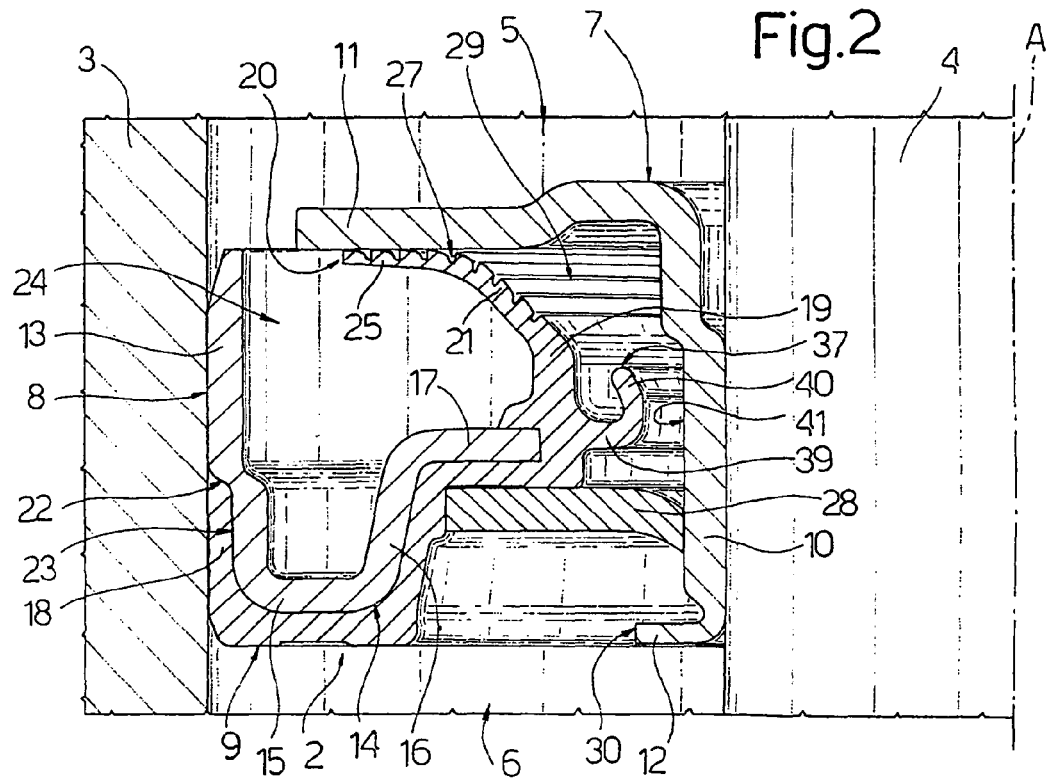

SEAL ASSEMBLY FOR A ROTARY MEMBER

The present invention relates to a seal assembly for a rotary member.

BACKGROUND OF THE INVENTION

In mechanical design, friction must be reduced by lubricating rotary members in an oil bath, and numerous applications call for immersing portions of the rotary members in the oil bath, while other portions, adjacent to them, operate in a sealed, oil-free environment. To do this, seal assemblies are known, as described for example in U.S. Pat. No. 5,348,312, which are housed inside the gap defined between a normally fixed, hollow casing and a rotary member housed inside the casing, and which, in use, seal the gap to prevent oil flow into the dry environment.

More specifically, seal assemblies of the above type are axially symmetrical with respect to the axis of the rotary member to which they are fitted, and comprise a metal inner ring integral with the rotary member; a metal outer ring fixed to the casing; and sealing members made of elastically deformable polymer material and interposed between the inner ring and the rotary member, between the outer ring and the casing, and between the rings themselves.

More specifically, the inner ring comprises an axial portion fitted to the inner ring; and two radial portions extending from respective opposite ends of the axial portion and inwards of the gap between the casing and the rotary member. In the example described in U.S. Pat. No. 5,348,312, the radial portion facing the oil bath is of a larger extension than the other radial portion, and terminates close to the casing.

In axial half-section, the outer ring is substantially L-shaped, and comprises an axial portion, and a radial portion extending from one end of the axial portion. More specifically, the radial portion of the outer ring is adjacent to the smaller-extension radial portion of the inner ring, and defines, with the other radial portion of the inner ring, a sealing chamber between the two rings.

The sealing members comprise a first seal pressed between the axial portion of the inner ring and the rotary member; and a second seal completely covering the outer ring and interposed between the outer ring and the casing to seal the chamber between the two rings.

More specifically, on the side facing the oil bath, the second seal has a lip which provides for contact sealing in contact with the larger-extension radial portion of the rotary inner ring.

The above contact seal has the typical drawback of producing rapid wear of the lip of elastomeric material.

To at least partly eliminate the above drawback, the lip has a number of concentric, radially equally spaced, circumferential grooves to reduce the contact surface and, therefore, friction with the rotary inner ring. Though it provides for prolonging the working life of the seal with the sealing lip, the above solution is not altogether satisfactory.

Seal assemblies are also known, as illustrated for example in U.S. Pat. No. 4,974,869, in which the sealing lip has no grooves, and the radial portion of the metal inner ring has a single spiral groove. In actual use, the sealing lip engages the spiral groove rotating integrally with the rotary member, thus again providing for contact sealing. Moreover, as the inner ring rotates integrally with the rotary member, the spiral groove produces a fluid-dynamic "pumping" effect of the air between the lip and the inner ring, which forces the oil towards the oil environment, thus enhancing sealing performance.

In this case too, extensive sliding contact between the spiral groove on the inner ring and the sealing lip of elastomeric material produces severe mechanical wear, and so greatly reduces the working life, of the lip. Moreover, the thinness of the inner ring and the technical difficulties encountered in machining it prevent the formation of deeper grooves shaped to vary airflow, so that the working life of the seal assembly and the effectiveness of the fluid-dynamic "pumping" effect remain limited.

SUMMARY OF THE INVENTION

It is an object of the present invention to provide a seal assembly for a rotary member, designed to eliminate the aforementioned drawbacks typically associated with known seal assemblies.

According to the present invention, there is provided a seal assembly as claimed in the attached claims.

BRIEF DESCRIPTION OF THE DRAWINGS

A preferred, non-limiting embodiment of the present invention will be described by way of example with reference to the accompanying drawings, in which:

FIG. 1 shows an axial section of a seal assembly for a rotary member, in accordance with the present invention;

FIG. 2 shows a larger-scale, axial half-section of the FIG. 1 seal assembly;

DETAILED DESCRIPTION OF THE INVENTION

Figure 3:
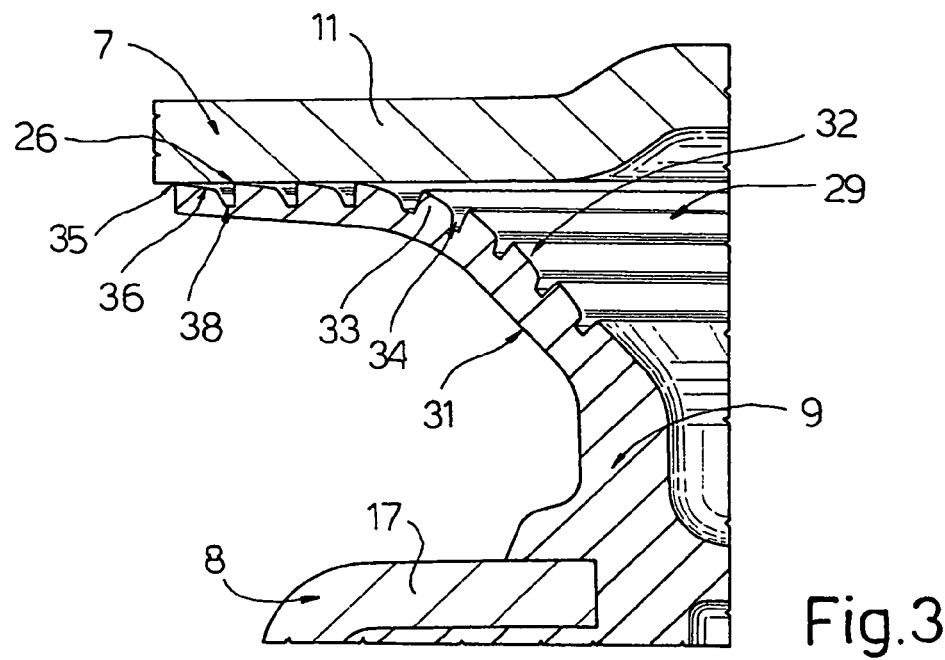
FIG. 3 shows a larger-scale section of a detail of the seal assembly in FIGS. 1 and 2.

In FIGS. 1 and 2, number 1 indicates as a whole a seal assembly housed in the gap 2 defined between a hollow casing 3 and a rotary member, e.g. a shaft 4, of axis A, housed inside casing 3. On opposite sides of seal assembly 1, gap 2 comprises an environment 5 for containing a lubricating oil bath; and an environment 6 from which oil must be kept out, and which in use contains air.

Seal assembly 1 comprises an inner ring 7 integral with shaft 4; an outer ring 8 integral with casing 3; and an elastomeric member 9 interposed between rings 7 and 8 and carried by ring 8.

Inner ring 7 comprises an axial portion 10 pressed in fluidtight manner onto shaft 4, and from the opposite ends of which respective radial portions 11, 12 project inside gap 2. One (11) of the radial portions faces environment 5, and extends almost up to casing 3, while the other (12) faces environment 6, and is of a much smaller extension than radial portion 11.

Outer ring 8 comprises an axial portion 13, from the end of which facing environment 6 a contoured portion 14 projects towards axial portion 10 of inner ring 7. Axial portion 13 is partly fitted in fluidtight manner to casing 3, and partly defines, by means of a shoulder 22 and with casing 3, a seat 23 for housing part of elastomeric member 9, as described in detail later on. As shown in FIGS. 1 and 2, axial portion 13 of outer ring 8 extends facing axial portion 10 of inner ring 7.

With particular reference to FIG. 2, as of axial portion 13, contoured portion 14 comprises a radial portion 15 extending towards shaft 4 and approximately along an extension of radial portion 12; a substantially axial portion 16 extending towards environment 5; and a radial portion 17 defining a free end of outer ring 8.

Elastomeric member 9 substantially comprises a contoured portion 18 fitted to the surface of portion 14 of outer ring 8 facing environment 6, and secured to portion 14; and a sealing lip 20 projecting from contoured portion 18, and cooperating with radial portion 11 of inner ring 7.

More specifically, contoured portion 18 cooperates with portions 15, 16 and 17 of portion 14 of outer ring 8, has a free end engaging seat 23 of outer ring 8, and is secured at the opposite end to the free end of portion 17.

Sealing lip 20 (FIGS. 2 and 3) extends from the end of contoured portion 18 secured to portion 17 of outer ring 8, and comprises, in succession towards its own free end, an axial portion 19; an oblique portion 21 sloping towards casing 3; and a radial portion 25 cooperating in fluidtight manner with radial portion 11 of inner ring 7. Lip 20 tapers in section towards its free end, and is bounded by two surfaces 31, 32 facing portion 14 of outer ring 8 and portion 11 of inner ring 7 respectively.

Lip 20 comprises, on surface 32, a number of alternating, equally spaced solid elements 33 and hollow elements 34 conferring a serrated appearance to the lip. Proceeding from radial portion 25 towards contoured portion 18, each pair of solid and hollow elements 33, 34 is bounded by a sharp edge 35 substantially perpendicular to surface 31; by a convex intermediate portion 36 sloping towards surface 31; and by a bottom portion 38 parallel to surface 31. In each solid element 33 cooperating with portion 11 of inner ring 7, sharp edge 35 and the adjacent portion of intermediate portion 36 combine to define a fluidtight sealing edge 26.

Figure 4:
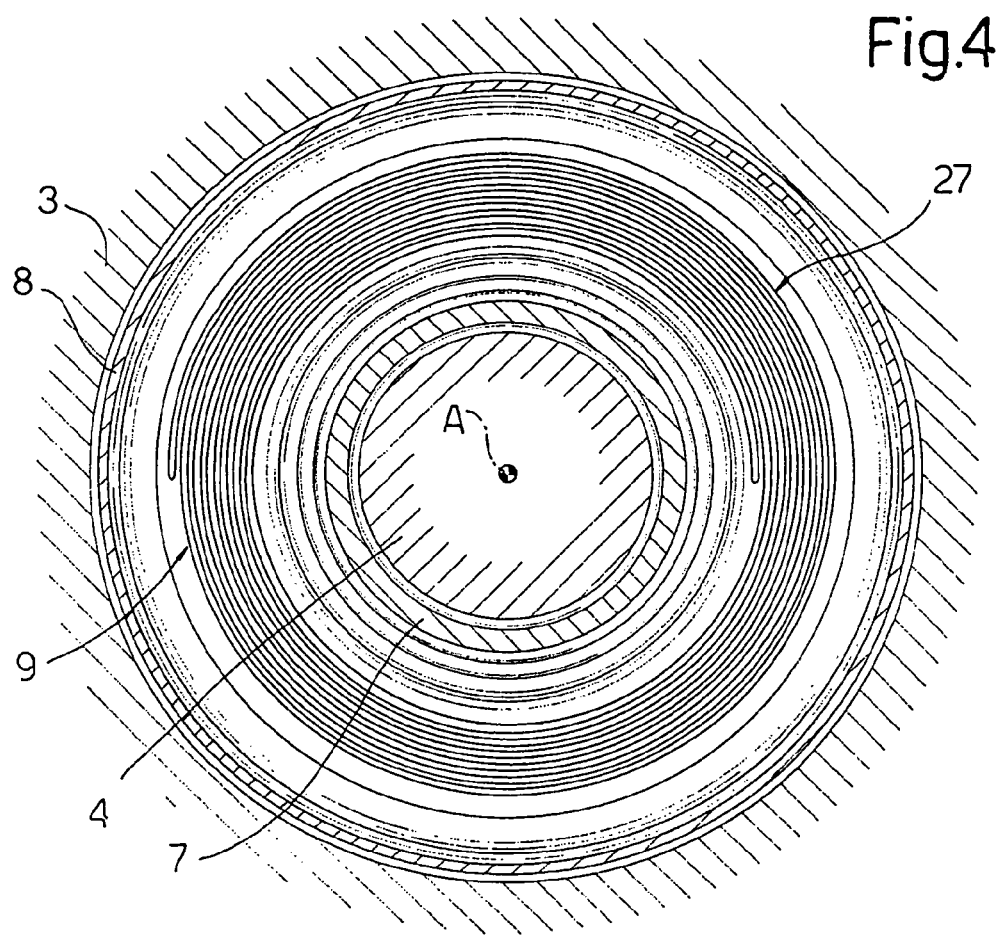
FIG. 4 shows a section along line IV-IV in FIG. 1.

An important aspect of the present invention lies in the equally spaced hollow elements 34 of surface 32 being defined by a spiral groove 27 of constant pitch and depth (FIG. 4), and which, in use, produces a thrust effect to push the oil particles from the sealing region towards the oil environment 5, as explained in detail later on.

The equally spaced sealing edges 26 defined by spiral groove 27 on lip 20, and inner ring 7 and outer ring 8 fitted respectively to shaft 4 and casing 3, provide for sealing gap 2 between shaft 4 and casing 3.

More specifically, elastomeric member 9 defines, with inner ring 7, an annular chamber 29 communicating with environment 6, and defines, with outer ring 8, an annular chamber 24 radially outwards with respect to annular chamber 29 and communicating with environment 5.

More specifically, chamber 29 is bounded radially inwards by axial portion 10 of inner ring 7, and radially outwards by contoured portion 18 and lip 20 of elastomeric member 9. Chamber 29 is bounded axially, on the environment 5 side, by radial portion 11 of inner ring 7 interacting with lip 20, and communicates, on the opposite side, with environment 6 via an annular opening 30 defined between radial portion 12 of inner ring 7 and the portion of elastomeric member 9 secured to portion 15 of outer ring 8.

A washer 28 is fitted inside chamber 29 to filter any foreign particles and let air through. More specifically, washer 28 is interference-fitted radially between axial portion 10 of inner ring 7 and the portion of elastomeric member 9 secured to axial portion 16 of outer ring 8, and part of its surface facing environment 5 cooperates with the portion of elastomeric member 9 secured to radial portion 17 of outer ring 8.

As shaft 4 rotates, the air flowing axially from environment 6 into chamber 29 through washer 28 is subjected by spiral groove 27 on lip 20 to a fluid-dynamic pumping effect which pumps it between lip 20 and radial portion 11 or inner ring 7, so that any oil from environment 5 in the sealing area is forced back into environment 5 and so prevented from flowing into environment 6.

To direct the air flowing into chamber 29 towards radial portion 25 of lip 20, elastomeric member 9 has a further annular lip 37 projecting from the portion of the elastomeric member secured to portion 17 of outer ring 8. Lip 37 defines a constriction 41 along the airflow into chamber 29, so as to accelerate airflow towards lip 20.

Moreover, when shaft 4 is stopped, lip 37 collects any oil left between groove 27 of lip 20 and radial portion 11 of inner ring 7, and which could leak into chamber 29. And, when shaft 4 is started again, the oil collected in the gap defined between lip 37 and axial portion 19 of lip 20 is pumped out of chamber 29 by a combination of centrifugal force and the fluid-dynamic pumping effect produced by spiral groove 27 of lip 20.

More specifically, in axial half-section, lip 37 is substantially L-shaped, and, proceeding towards its free end, comprises a first radial section 39 facing axial portion 10 of inner ring 7; and a second portion 40 facing environment 5 and sloping slightly towards casing 3.

The advantages of seal assembly 1 according to the present invention will be clear from the foregoing description.

In particular, providing lip 20 with equally spaced sealing edges 26 defined by spiral groove 27 produces a fluid-dynamic air pumping effect on the oil, thus greatly reducing mechanical wear of lip 20, which only cooperates superficially with inner ring 7, without penetrating it. More specifically, the reduction in wear of lip 20 has been found to be due to the formation, in use, of a sort of air cushion between lip 20 and the mating surface of inner ring 7.

In other words, sealing between lip 20 and inner ring 7 is predominantly fluid-dynamic.

Moreover, spiral groove 27 being formed in an elastomeric material injection molded in an easily machined mold, the shape and depth of groove 27 can be varied as required to conform more closely to given operating requirements, and in particular to achieve a marked increase in the fluid-dynamic "pumping" effect and in the working life of seal assembly 1.

Clearly, changes may be made to seal assembly 1 as described and illustrated herein without, however, departing from the scope of the accompanying Claims.

In particular, elastomeric member 9 may comprise a number of separate bodies fitted to outer ring 8.

Spiral groove 27 may be a multiple spiral.

Finally, washer 28 may be replaced by an appendix of elastomeric member 9, which defines a seal for liquid or particle material, but does not interfere with inner ring 7, so as to let air through.

The invention claimed is:

1. A seal assembly for sealing a gap between a rotary member and a fixed member housing the rotary member, so as to prevent passage of a fluid from a first environment to a second environment located on opposite sides of said gap, said seal assembly comprising:
    a first ring integral with said rotary member;
    a second ring integral with said fixed member; and
    an elastically deformable sealing member integral with said second ring, and comprising a single sealing lip cooperating in a fluid-tight manner with a mating portion of said first ring, and an annular lip for retaining fluid;
    wherein on the side cooperating with said mating portion, said sealing lip comprises a spiral groove which, in use, produces a fluid-dynamic pumping effect to pump said fluid away from the sealing area and towards the first environment;

wherein a cooperation area between the sealing lip and the mating portion extends radially with respect to an axis, about which the rotary member can rotate;

wherein the sealing lip comprises an end portion cooperating in fluid-tight manner with a mating portion of the first ring and extending orthogonally with respect to an axis, about which the rotary member can rotate;

wherein the cooperation area between the end portion of the sealing lip and said mating portion extends orthogonally with respect of such axis, so that such cooperation area is annularly-shaped, and thereby bounded between two circumferences having the same centre on such axis;

wherein the cooperation area extends radially enough to allow at least three spires of said groove to face the mating portion of the first ring; and wherein the extension of said cooperation area measured radially to said axis is more than 10% of the distance between said axis and farthest point of said end portion of said sealing lip from said axis.

2. A seal assembly as claimed in claim 1, wherein the fluid-dynamic effect is produced by generating flow of a second fluid from said second to said first environment by means of said groove; and wherein said seal member comprises a flow-diverting structure for directing said second fluid towards said lip.

3. A seal assembly as claimed in claim 2, wherein said sealing member defines, with said first ring, a constriction along the flow of said second fluid.

4. A seal assembly as claimed in claim 3, wherein said flow diverting structure and said constriction are defined by said annular lip.

5. A seal assembly according to claim 1, wherein, on the side cooperating with said mating portion, said sealing lip comprises a plurality of alternating solid elements and hollow elements which are defined by respective spires of said groove, the radial extension of said cooperation area being such that at least four solid elements cooperate with said mating portion.

6. A seal assembly according to claim 5, wherein each said solid elements comprise a sharp edge and an end portion which is sloped with respect to said sharp edge, said sharp edges of said end portion being arranged, in use, orthogonally to said mating portion.

7. A seal assembly according to claim 1, wherein said end portion comprises a further portion which is angled with respect to said end portion.

8. A seal assembly for sealing the gap between a rotary member and a fixed member housing the rotary member, so as to prevent passage of a fluid from a first environment to a second environment located on opposite sides of said gap, said seal assembly comprising:

a first ring integral with said rotary member;

a second ring integral with said fixed member; and an elastically deformable sealing member integral with said second ring, and comprising a single sealing lip cooperating in a fluid-tight manner with a mating portion of said first ring, and an annular lip for retaining fluid;

wherein on the side cooperating with said mating portion, said sealing lip comprises one spiral groove which, in use, produces a fluid-dynamic pumping effect to pump said fluid away from the sealing area and towards the first environment;

wherein a cooperation area between the sealing lip and the mating portion extends radially with respect to an axis, about which the rotary member can rotate;

wherein the sealing lip comprises an end portion cooperating in fluid-tight manner with a mating portion of the first ring and extending orthogonally with respect to an axis, about which the rotary member can rotate;

wherein the cooperation area between the end portion of the sealing lip and said mating portion extends orthogonally with respect of such axis, so that such cooperation area is annularly-shaped, and thereby bounded between two circumferences having the same center on such axis;

wherein the cooperation area extends radially enough to allow at least three spires of said spiral groove to face the mating portion of the first ring;

wherein, on the side cooperating with said mating portion, said sealing lip comprises a plurality of alternating solid elements and hollow elements which are defined by respective spires of said groove; the radial extension of said cooperation area being such that at least four solid elements cooperate with said mating portion.

* * * * *